(12) United States Patent
Grot

(10) Patent No.: US 6,740,445 B1
(45) Date of Patent: May 25, 2004

(54) COATED FUEL CELL ELECTRODES

(75) Inventor: Stephen Andreas Grot, Newark, DE (US)

(73) Assignee: Ion Power, Inc., Bear, DE (US)

( * ) Notice: Subject to any disclaimer, the term of this patent is extended or adjusted under 35 U.S.C. 154(b) by 176 days.

(21) Appl. No.: 10/020,837

(22) Filed: Dec. 13, 2001

Related U.S. Application Data

(63) Continuation-in-part of application No. 09/795,930, filed on Feb. 28, 2001, now abandoned.
(60) Provisional application No. 60/185,924, filed on Feb. 29, 2000.

(51) Int. Cl.[7] .................................................. H01M 4/86
(52) U.S. Cl. .............................. 429/42; 429/33; 429/40
(58) Field of Search .............................. 429/40, 41, 42, 429/44, 33

(56) References Cited

U.S. PATENT DOCUMENTS

| | | |
|---|---|---|
| 3,784,399 A | 1/1974 | Grot |
| 4,599,157 A | 7/1986 | Suzuki |
| 4,876,115 A | 10/1989 | Raistrick |
| 4,943,496 A * | 7/1990 | Okada et al. .................. 429/45 |
| 5,242,764 A | 9/1993 | Dhar |
| 5,318,863 A | 6/1994 | Dhar |
| 5,474,857 A * | 12/1995 | Uchida et al. ................. 429/33 |
| 5,521,020 A | 5/1996 | Dhar |
| 6,054,230 A * | 4/2000 | Kato ........................... 429/33 |
| 6,074,773 A | 6/2000 | Wilkinson |

OTHER PUBLICATIONS

S. Yan, B. Sompalli, M. Scozzafava, H.A. Gasteiger, "Effect of Catalyst Layer and Membrane Thickness on Performance of Polymer Electrolyte Fuel Cells", Mar. 25–29, 2001, 2 pgs.

T.E. Springer, M.S. Wilson, S. Gottesfeld, "Modeling and Experimental Diagnostics in Polymer Electolyte Fuel Cells", J. Electrochem, Soc., vol. 140 No. 12, 1992, 3513.

* cited by examiner

*Primary Examiner*—Bruce F. Bell
(74) *Attorney, Agent, or Firm*—Huntley & Associates, LLC

(57) ABSTRACT

Electrodes coated with transport polymer such as perfluoroether aid in water management and CO mitigation in fuel cells.

11 Claims, 1 Drawing Sheet

COATED FUEL CELL ELECTRODES

CROSS-REFERENCE TO RELATED APPLICATIONS

This is a Continuation-in-Part of application Ser. No. 09/795,930, filed Feb. 28, 2001 now abandoned, which is based on Provisional Serial No. 60/185,924 filed Feb. 29, 2000.

BACKGROUND OF THE INVENTION

Electrodes for proton exchange membrane fuel cells are typically made by mixing a slurry of carbon black with deposited platinum particles together with a liquid dispersion of ion conducting polymer solution. This slurry is then cast into a film and dried and the resulting film is a porous electrode that has a three-dimensional reaction zone with ionic conducting paths, electronic conducting paths and void spaces for reactant or byproduct transport. A continuing need for such structures is to balance the water content of the electrode and the underlying membrane with the open void space of the electrode for oxygen transport. It is known that the oxygen diffusion rate in water is roughly three to four orders of magnitude less than that in free air. Thus, if the catalyst sites are blocked with a film of water with any significant thickness, the reaction rate slows due to lack of oxygen transport. On the other hand, if not enough water is incorporated in the ionomer part of the electrode, then the ionic conductivity of the ionomer is drastically reduced, and the overall resistance of the cell increases. This balance is referred to in the literature as "water management."

SUMMARY OF THE INVENTION

The instant invention provides electrodes which aid in water management in fuel cells.

Specifically, the instant invention provides an electrode suitable for use in a fuel cell bearing a coating of at least one transport polymer. The invention further provides, in a fuel cell comprising at least one cathode and at least one anode and an ion exchange membrane separating the cathode and the anode, the improvement wherein at least one electrode bears a coating of at least one transport polymer.

DETAILED DESCRIPTION OF THE INVENTION

Figure 1:
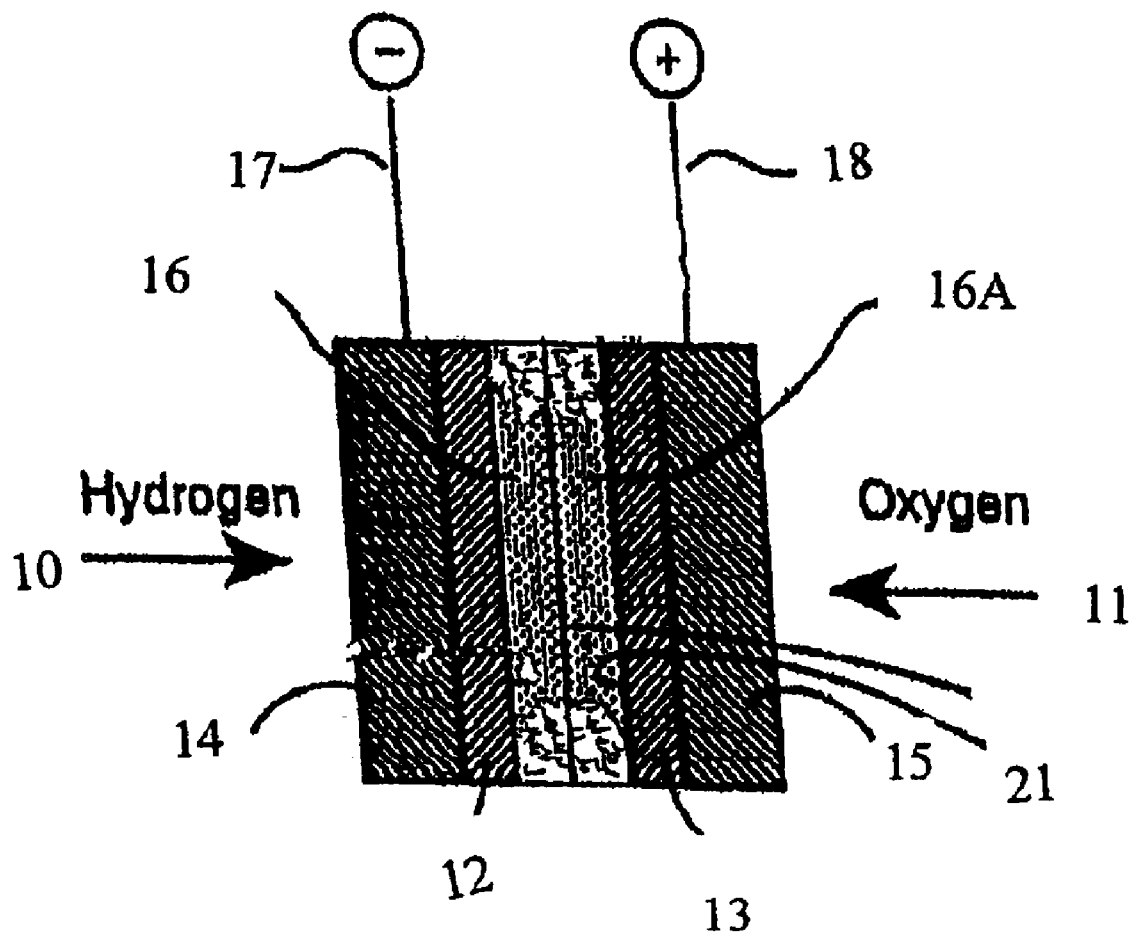
FIG. 1 is a schematic, cross-sectional illustration of a fuel cell of the present invention.

A wide variety of coating polymers can be used in the present invention. When used on the anode, the coating functions as an oxygen transport polymer. When used on the cathode, it functions as a hydrogen transport polymer. The basic requirement of such polymers is that they permit higher oxygen or hydrogen transport than the water typically found in fuel cells, or exhibit high water repellency properties, or both. Representative polymers which can be used in the present invention are perfluoroethers, such as those having the general formula:

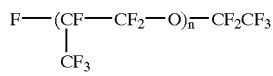

wherein n = 10 to 60, and in which the carbon chain is saturated and contains only carbon, oxygen and fluorine. Other transport polymers which can be used include perfluoropentane, such as that commercially available from F2 Chemicals, Ltd. of the United Kingdom as Flutec perfluorocarbon liquids; and polytetrafluoroethylenes including crystalline polymers and those that are substantially amorphous. Still other transport polymers which can be used include silicone oils, and particularly polydimethylsiloxanes.

The transport polymer can be applied to the electrode by any convenient means, including application by brush or spray or dip coating of the polymer. The polymer is often in the form of an oil, and is generally applied to one surface of the electrode. After application, excess polymer is preferably removed from the surface. Preferably, the polymer is applied to the cathode of a fuel cell assembly. The coating can be continuous or discontinuous. The quantity of the oxygen transport polymer applied will necessarily vary with the specific polymer and the design of the fuel cell into which it is incorporated. However, in general, about from 0.2 to 2.0 $mg/cm^2$ has been found to be beneficial.

The electrodes are typically incorporated into a fuel cell comprising at least one cathode and at least one anode and an ion exchange membrane separating the cathode and the anode. Such a fuel cell is illustrated in FIG. 1, which is a schematic, cross-sectional illustration of such a fuel cell. There, fuel source 10 and oxidizer source 11 supply anode 12 and cathode 13, respectively. The electrodes are assembled with backing layers 14 and 15, respectively. A separatory ion exchange membrane is formed from ionomer layers 16 and 16A. Anode connection 17 and cathode connection 18 connect with an external circuit (not shown) or with other fuel cell assemblies. In accordance with the present invention, oxygen transport polymer is coated onto the inner cathode surface 21.

In operation, it has been found that the oxygen transport polymer diffuses into the electrode, facilitating water management in the electrolytic cell. The mechanism of this benefit is not fully understood, and is particularly surprising in view of the fact that the oxygen transport polymers are typically oils that would be expected to disrupt, rather than aid, the functioning of an electrolytic cell. In practice, these oils are believed to prevent the ionomer components in the cathode electrode from drying out, while continuing to permit electrons and oxygen to pass. In addition, the oils exclude water from the voids of the cathode electrode layer, substituting a material that has an affinity for oxygen. Moreover, the beneficial effect is long lasting, in that the oxygen or hydrogen transport polymers typically have a low vapor pressure, which results in insignificant loss due to vaporization.

An additional advantage of applying a coating to an electrode of a fuel cell is the mitigation of carbon monoxide poisoning on the anode catalyst when operating on reformed hydrocarbon fuel streams. The transport mechanisms of most coatings previously investigated rely on the principle of a molecular sieve. Thus the coating material will more readily pass small molecules and will block the transport of large molecules. Since the CO molecule is more than ten times larger than the hydrogen molecule, the application of a similar coating to the anode catalyst site would reduce the exposure of that catalyst to the CO.

Typically in PEM fuel cell systems, the CO content of the fuel stream needs to be reduced to 50 ppm or less. The present invention provides significant fuel processing benefits, in that the coating reduces the amount of CO that reaches the catalyst, thereby reducing the need for CO removal.

The present invention is further illustrated by the following specific example.

EXAMPLE

A catalyst layer coating was made by dispersing 40 wt % Pt on carbon available from Englehard in NAFION™ solution. The catalyst solution was coated onto a decal material and dried under forced hot air. The resulting electrode was hot pressed at 135° C. for 3 minutes onto a 1 mil thick NAFION™ ionomer membrane. The cathode side electrode was coated with perfluoropolyether (PFPE) solution and dabbed "dry" with an adsorbent wipe. Weighing the sample before and after application of the PFPE solution indicated that 18 mg of the PFPE was applied over 25 cm². The sample was tested in a fuel cell at varying temperatures and humidification conditions and found to have performance superior in all cases to control samples made at the same time which were identical except for the PFPE treatment.

I claim:

1. An electrode suitable for use in a fuel cell bearing a coating of at least one transport polymer which permits higher oxygen or hydrogen transport than water.

2. An electrode of claim 1 wherein the transport polymer comprises at least one perfluoroether.

3. An electrode of claim 2 wherein the perfluoroether is characterized by the general formula:

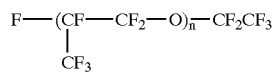

wherein n = 10 to 60, and the carbon chain is saturated and contains only carbon, oxygen and fluorine.

4. An electrode of claim 1 wherein the transport polymer comprises perfluoropentane.

5. An electrode of claim 1 wherein the transport polymer comprises substantially amorphous polytetrafluoroethylene.

6. An electrode of claim 5 wherein the polytetrafluoroethylene is substantially amorphous.

7. An electrode of claim 1 wherein the transport polymer comprises at least one silicone oil.

8. An electrode of claim 7 wherein the silicone oil comprises polydimethylsiloxane.

9. An electrode of claim 1 wherein the transport polymer is on one surface of the electrode.

10. In a fuel cell comprising at least one cathode and at least one anode and an ion exchange membrane separating the cathode and the anode, the improvement wherein at least one electrode bears a coating of at least one transport polymer which permits higher oxygen or hydrogen transport than water.

11. A fuel cell of claim 10 wherein the transport polymer is an oxygen transport polymer on the cathode.

* * * * *

UNITED STATES PATENT AND TRADEMARK OFFICE
CERTIFICATE OF CORRECTION

PATENT NO. : 6,740,445 B1 Page 1 of 1
DATED : May 25, 2004
INVENTOR(S) : Stephen A. Grot It is certified that error appears in the above-identified patent and that said Letters Patent is hereby corrected as shown below:

Column 4,
Line 26, insert
-- 12. A fuel cell of Claim 10 wherein the transport polymer is a hydrogen transport polymer on the anode. --

Signed and Sealed this

Ninth Day of November, 2004

JON W. DUDAS
*Director of the United States Patent and Trademark Office*